(12) United States Patent
Qu (10) Patent No.: US 12,127,565 B1
(45) Date of Patent: Oct. 29, 2024

(54) SMOKING DEVICE AND METHOD FOR DRINK AND FOOD

(71) Applicant: Shiji Qu, Liaoning (CN)

(72) Inventor: Shiji Qu, Liaoning (CN)

(*) Notice: Subject to any disclaimer, the term of this patent is extended or adjusted under 35 U.S.C. 154(b) by 0 days.

(21) Appl. No.: 18/424,803

(22) Filed: Jan. 27, 2024

(51) Int. Cl.
*A23B 4/052* (2006.01)
*C12G 3/07* (2006.01)
*A23B 4/044* (2006.01)

(52) U.S. Cl.
CPC ............... *A23B 4/052* (2013.01); *C12G 3/07* (2019.02); *A23B 4/044* (2013.01)

(58) Field of Classification Search
CPC ....... A23B 4/052; A23B 4/0523; A23B 4/044; A23B 4/056
USPC .......................................................... 99/482
See application file for complete search history.

(56) References Cited

U.S. PATENT DOCUMENTS

| 5,193,445 A * | 3/1993 | Ferguson | A23B 4/044 206/524.6 |
| 11,744,256 B2 * | 9/2023 | Sumner | A23B 4/0523 426/314 |
| 2022/0361543 A1 * | 11/2022 | Middleton | A23L 27/27 |

* cited by examiner

*Primary Examiner* — Reginald Alexander (57) ABSTRACT

The present disclosure provides a smoking device for drink and food. The smoking device for drink and food includes a base and a supporting net. An upper surface of the base is sunken downwards to form a combustion groove. The combustion groove is configured to accommodate fuel. A lower surface of the base is sunken upwards to form a smoke passage. The smoke passage extends upwards through a side wall of the combustion groove and is communicated to the combustion groove. At least a portion of the supporting net is inserted to a bottom of the combustion groove and is configured to support the fuel. And when the fuel in the combustion groove is ignited, the smoke passage allows smoke produced by fuel combustion in the combustion groove to pass through. The present disclosure also provides a smoking method for drink and food.

18 Claims, 10 Drawing Sheets

SMOKING DEVICE AND METHOD FOR DRINK AND FOOD

BACKGROUND OF THE INVENTION

The present disclosure relates to the technical field of food and drink, and in particular, to a smoking device and method for drink and food.

Using smoke to smoke food and drink to change flavors of the food and the drink, obtain unique tastes, and prolong storage time of the food and the drink is a common food and drink processing method. For many spirits such as whiskey, traditionally, a flavor is added by introducing distilled spirits into hogsheads or other types of drums, but this method is time-consuming.

At present, according to existing smoking devices for drink and food on the market, smoke produced by burning wood chips, spices, and other fuels is usually used to directly smoke the food or drink, so that the food or drink can quickly have woody and smoky flavors. This type of product usually includes a combustion chamber, a through hole communicated to the combustion chamber, and a downward protruding guide pipe part. However, during use of this type of product, ash produced by fuel combustion can easily fall into a container through the through hole, which contaminates the food or drink, resulting in poor user experience.

For this purpose, the present disclosure provides a smoking device and method for drink and food, which can effectively solve the above problems. The smoking device has a simple structure and convenience in use, and effectively isolates the combustion chamber from a smoking space for food or drink.

SUMMARY OF THE INVENTION

In order to overcome the shortcomings of the prior art, the present disclosure provides a smoking device and method for drink and food. The smoking device has a simple structure and convenience in use, and effectively isolates the combustion chamber from a smoking space for food or drink.

The technical solution adopted by the present disclosure to solve the technical problem is as follows.

The present disclosure provides a smoking device for drink and food, including:

a base, wherein an upper surface of the base is sunken downwards to form a combustion groove; the combustion groove is configured to accommodate fuel; a lower surface of the base is sunken upwards to form a smoke passage; the smoke passage extends upwards through a side wall of the combustion groove and is communicated to the combustion groove; and a supporting net, wherein at least a portion of the supporting net is inserted to a bottom of the combustion groove and is configured to support the fuel; and when the fuel in the combustion groove is ignited, the smoke passage allows smoke produced by fuel combustion in the combustion groove to pass through.

As the improvement of the present disclosure, the base is provided with a through hole which penetrates through the combustion groove; the through hole is arranged below the supporting net; and the smoke passage is communicated to the combustion groove through the through hole.

As the improvement of the present disclosure, the through hole slantways extends downwards from the combustion groove to the smoke passage, and a gap exists between an upper end of the through hole and a bottom wall of the combustion groove.

As the improvement of the present disclosure, the smoke passage is arranged in an annular shape around the combustion groove; the base is provided with a plurality of through holes; and the various through holes are arranged on the side wall of the combustion groove at intervals.

As the improvement of the present disclosure, a lower end of the through hole is communicated to a middle part of the smoke passage, so that the smoke passage is divided into an upper part and a lower part.

As the improvement of the present disclosure, the lower surface of the base is further provided with an air exchange slot; and the air exchange slot extends from the smoke passage towards an edge of the base.

As the improvement of the present disclosure, a side surface of the base is provided with a friction surface, and the friction surface is configured to be gripped by a user.

As the improvement of the present disclosure, a middle part of the supporting net is sunken downwards to form an accommodating part; a lower surface of an edge of the supporting net is abutted with the upper surface of the base; and the accommodating part is inserted along the combustion groove.

As the improvement of the present disclosure, an abutting platform is arranged on the side wall of the combustion chamber in a protruding manner; the supporting net is inserted into the combustion groove; and an edge of the supporting net is abutted with the abutting platform.

As the improvement of the present disclosure, the smoking device for drink and food further includes a cover body, wherein a mounting block is arranged around an edge of the upper surface of the base in a protruding manner; and the cover body is abutted with the mounting block and is covered at the upper surface of the base.

The present disclosure also provides a smoking method for drink and food, including: providing a smoking device, wherein the smoking device includes:

a base, wherein an upper surface of the base is sunken downwards to form a combustion groove; the combustion groove is configured to accommodate fuel; a lower surface of the base is sunken upwards to form a smoke passage; the smoke passage extends upwards through a side wall of the combustion groove and is communicated to the combustion groove; and a supporting net, wherein at least a portion of the supporting net is inserted to a bottom of the combustion groove and is configured to support the fuel; and when the fuel in the combustion groove is ignited, the smoke passage allows smoke produced by fuel combustion in the combustion groove to pass through.

As the improvement of the present disclosure, the base is provided with a through hole which penetrates through the combustion groove; the through hole is arranged below the supporting net; and the smoke passage is communicated to the combustion groove through the through hole.

As the improvement of the present disclosure, the through hole slantways extends downwards from the combustion groove to the smoke passage, and a gap exists between an upper end of the through hole and a bottom wall of the combustion groove.

As the improvement of the present disclosure, the smoke passage is arranged in an annular shape around the combustion groove; the base is provided with a plurality of through holes; and the various through holes are arranged on the side wall of the combustion groove at intervals.

As the improvement of the present disclosure, a lower end of the through hole is communicated to a middle part of the smoke passage, so that the smoke passage is divided into an upper part and a lower part.

As the improvement of the present disclosure, the lower surface of the base is provided with an air exchange slot; and the air exchange slot extends from the smoke passage towards an edge of the base.

As the improvement of the present disclosure, a side surface of the base is provided with a friction surface, and the friction surface is configured to be gripped by a user.

As the improvement of the present disclosure, a middle part of the supporting net is provided with an accommodating part that is sunken downwards; a lower surface of an edge of the supporting net is abutted with the upper surface of the base; and the accommodating part is inserted along the combustion groove.

As the improvement of the present disclosure, an abutting platform is arranged on the side wall of the combustion chamber in a protruding manner; the supporting net is inserted into the combustion groove; and an edge of the supporting net is abutted with the abutting platform.

As the improvement of the present disclosure, the smoking method for drink and food further includes: providing a cover body, wherein a protruding mounting block is arranged around an edge of the upper surface of the base; and the cover body is abutted with the mounting block and is covered at the upper surface of the base.

The present disclosure has the following beneficial effects. By the arrangement of the above structure, during use, the base is arranged on a drink or food container. The lower surface of the base is abutted with an edge of an opening of the drink or food container to cover an opening of the drink or food container. The lower surface of the base and an inner wall of the drink or food container form a smoking space. The lower surface of the base is flat and can adapt to various containers. The fuel is placed in the combustion groove and is ignited. The fuel is combusted to produce smoke. The smoke passes through the side wall of the combustion groove and flows into the drink or food container along the smoke passage to smoke the drink or food. Furthermore, the supporting net can support the fuel, prevent the fuel and ash after fuel combustion from entering the drink or food container along the smoke passage, and ensure the cleanliness of the drink or food.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Referring to FIG. 1 to FIG. 10, a smoking device for drink and food includes:

a base 10, wherein an upper surface of the base 10 is sunken downwards to form a combustion groove 11; the combustion groove 11 is configured to accommodate fuel; a lower surface of the base 10 is sunken upwards to form a smoke passage 12; the smoke passage 12 extends upwards through a side wall of the combustion groove 11 and is communicated to the combustion groove 11; and a supporting net 20, wherein at least a portion of the supporting net 20 is inserted to a bottom of the combustion groove 11 and is configured to support the fuel; and when the fuel in the combustion groove 11 is ignited, the smoke passage 12 allows smoke produced by fuel combustion in the combustion groove 11 to pass through.

Figure 1:
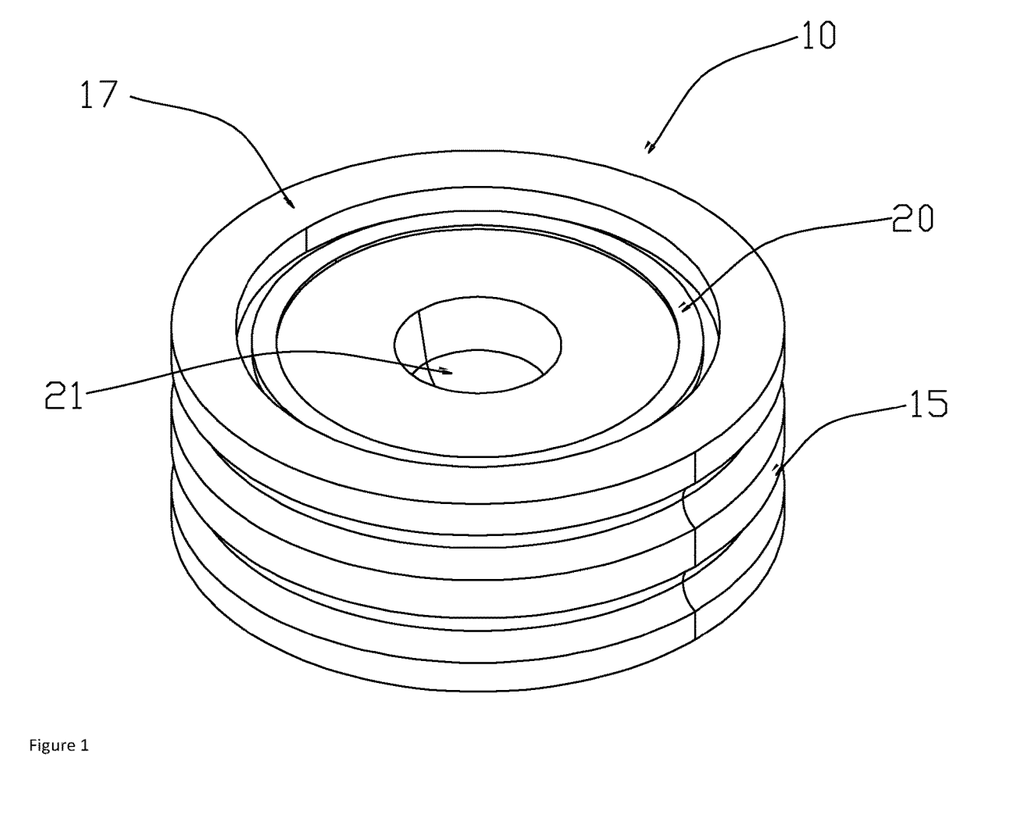
FIG. 1 is a partially schematic structural diagram of an angle according to a first embodiment of the present disclosure.
Figure 2:
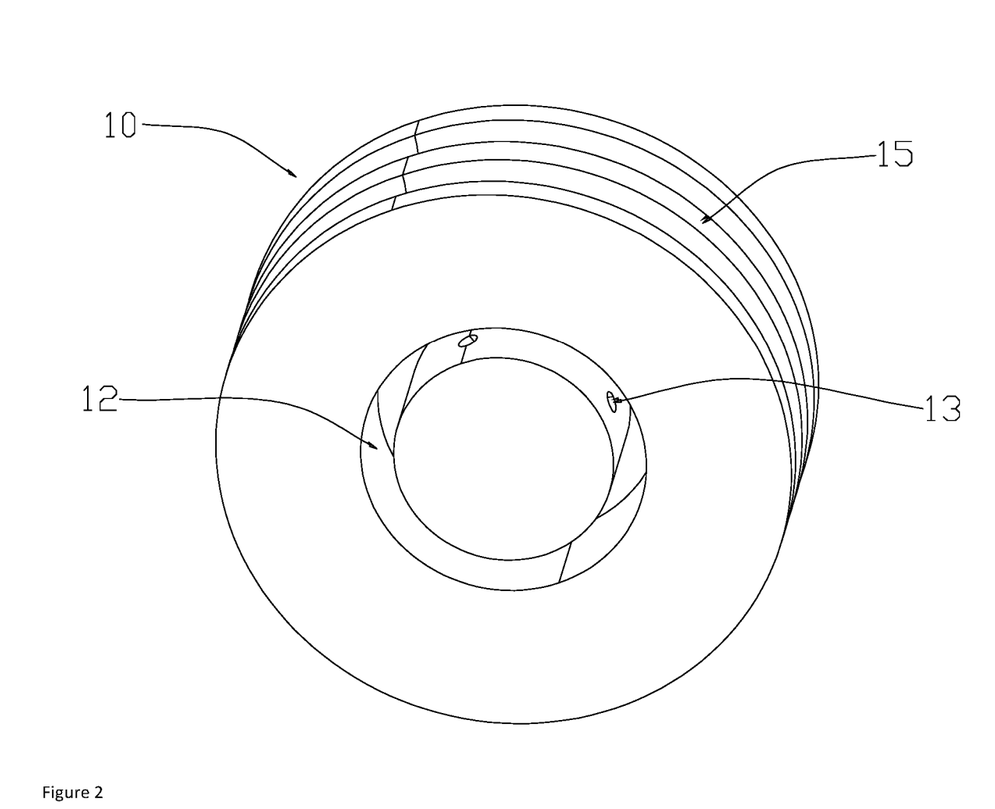
FIG. 2 is a partially schematic structural diagram of another angle according to a first embodiment of the present disclosure.
Figure 3:
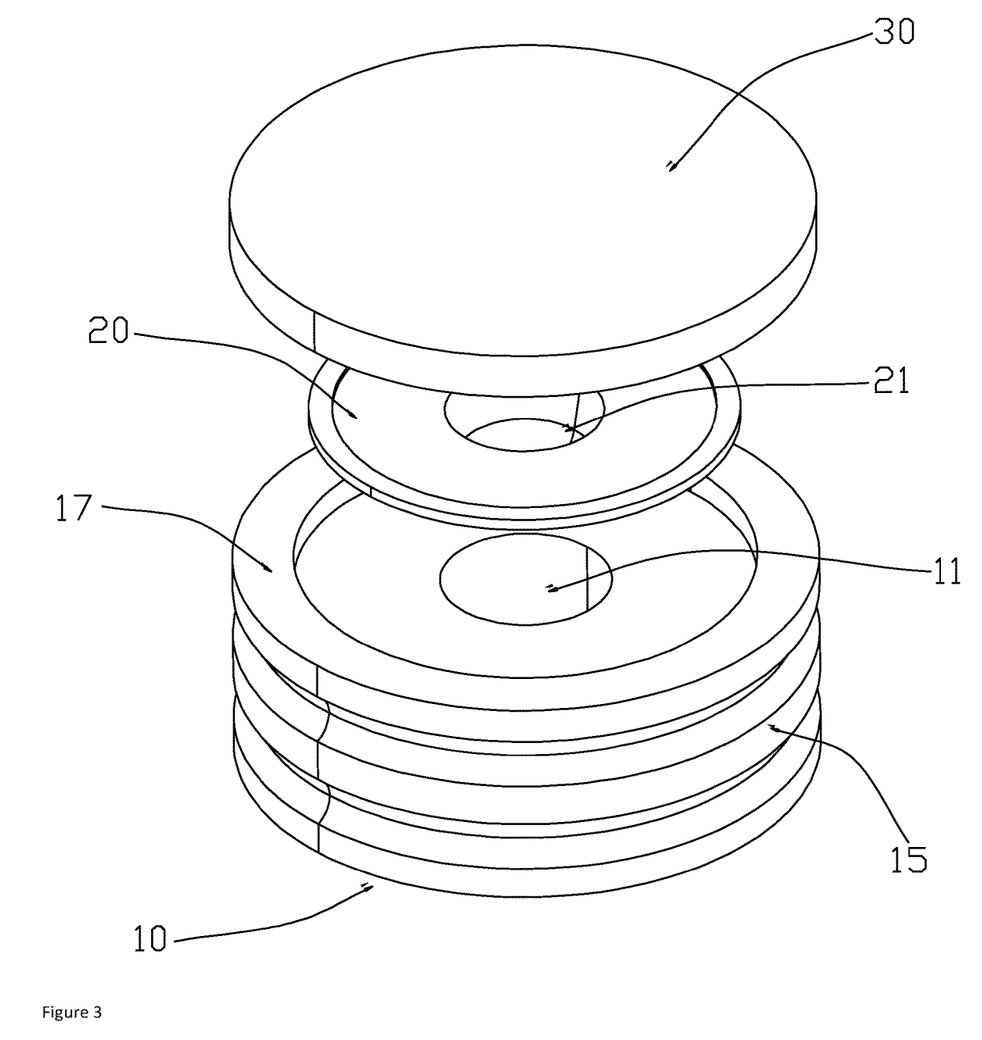
FIG. 3 is a schematic diagram of an exploded structure in an angle according to a first embodiment of the present disclosure.
Figure 4:
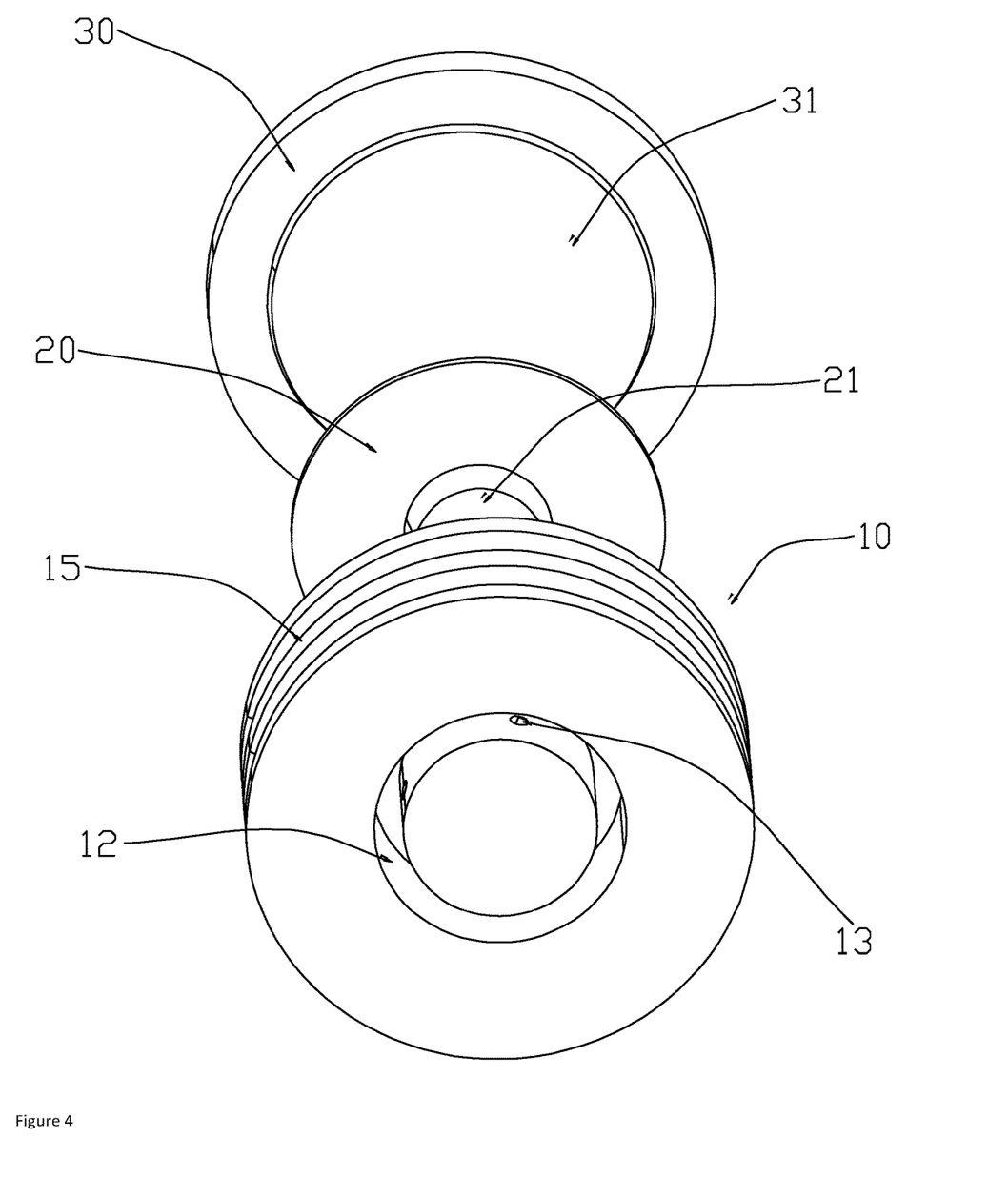
FIG. 4 is a schematic diagram of an exploded structure in another angle according to a first embodiment of the present disclosure.
Figure 5:
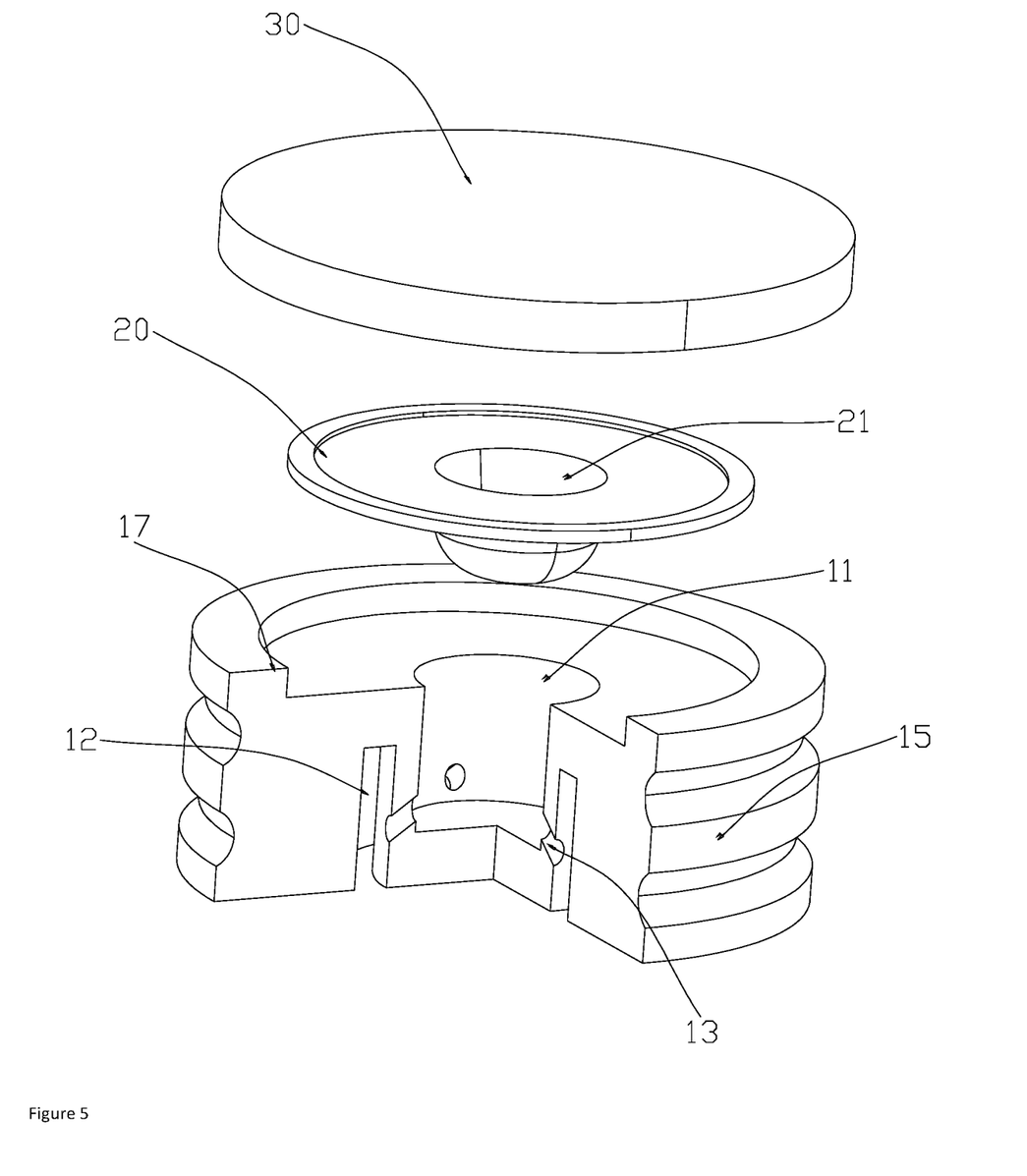
FIG. 5 is a partially cross-sectional view of an exploded state according to a first embodiment of the present disclosure.
Figure 6:
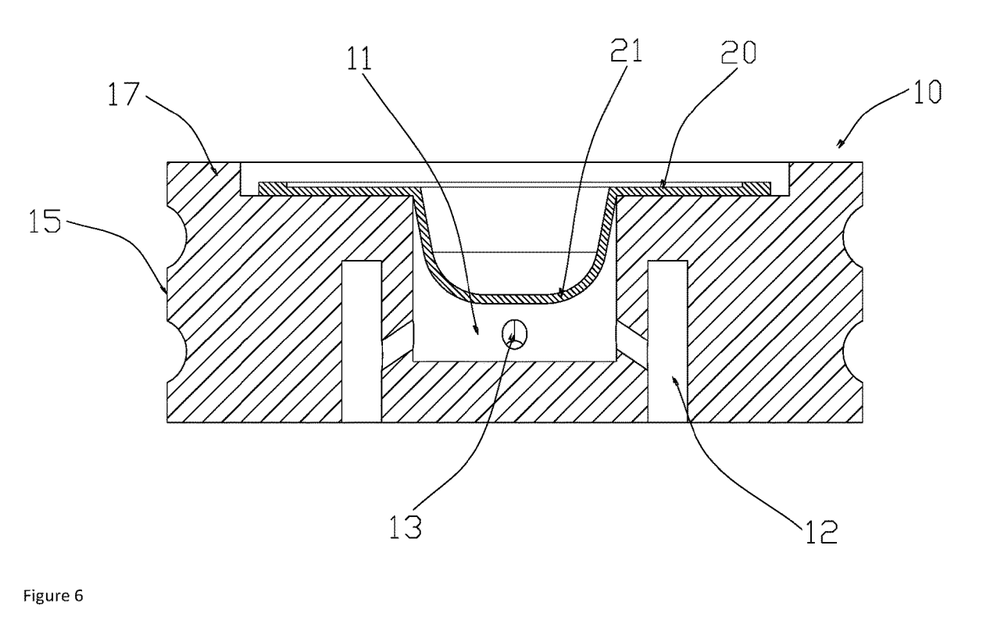
FIG. 6 is a schematic diagram of a cross-sectional structure according to a first embodiment of the present disclosure.
Figure 7:
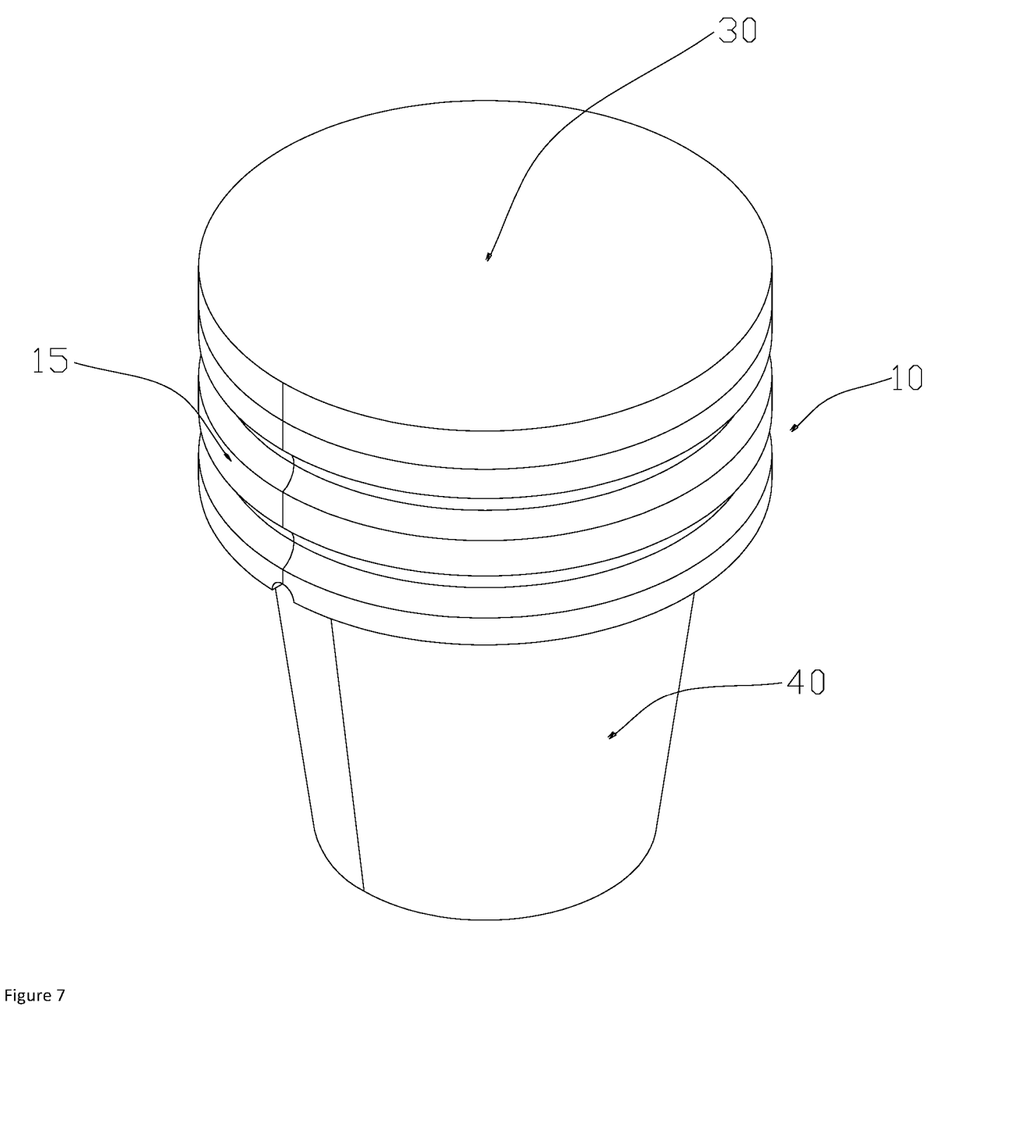
FIG. 7 is a schematic diagram of a usage state according to a first embodiment of the present disclosure.
Figure 8:
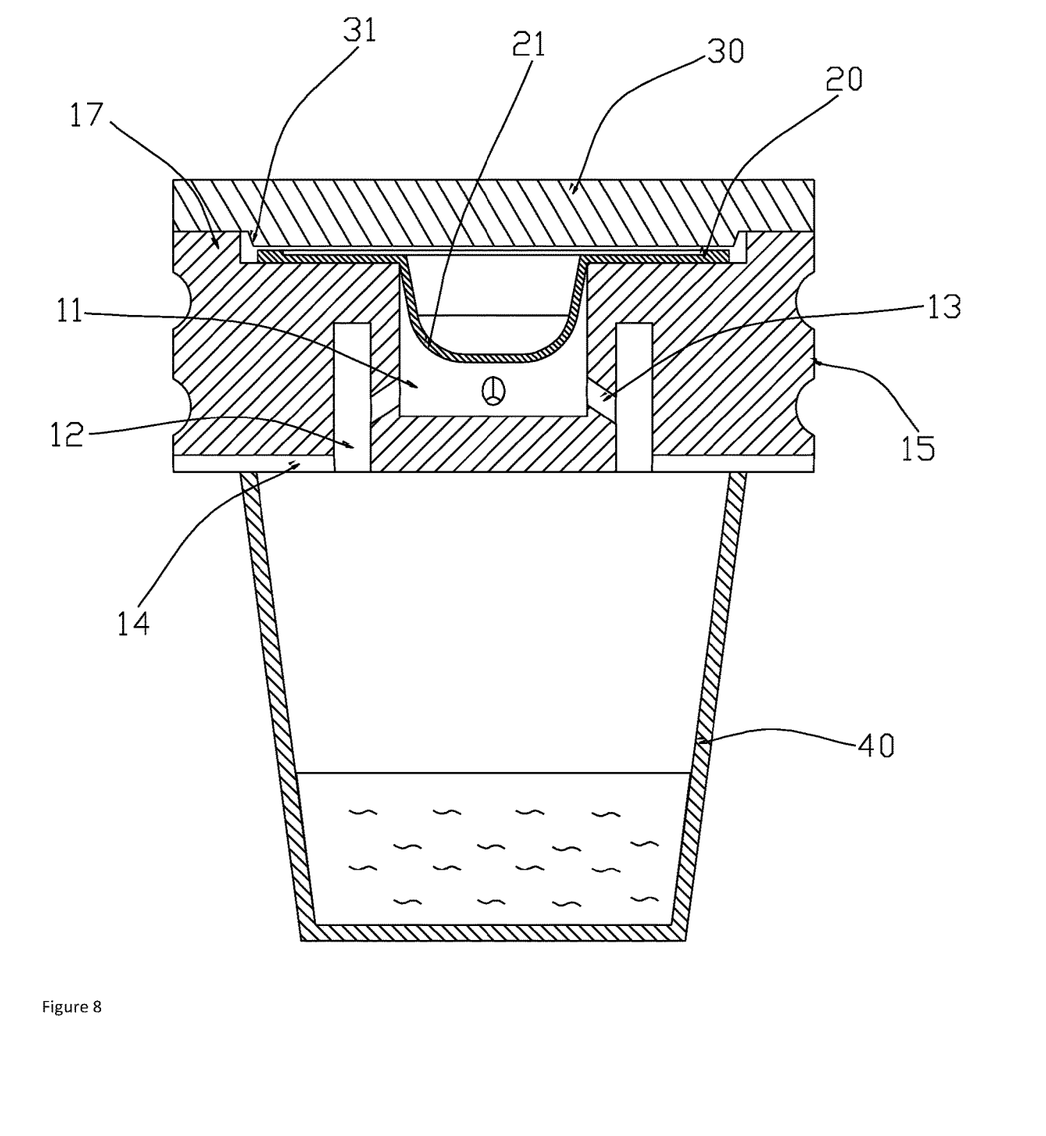
FIG. 8 is a cross-sectional view according to a first embodiment of the present disclosure.
Figure 9:
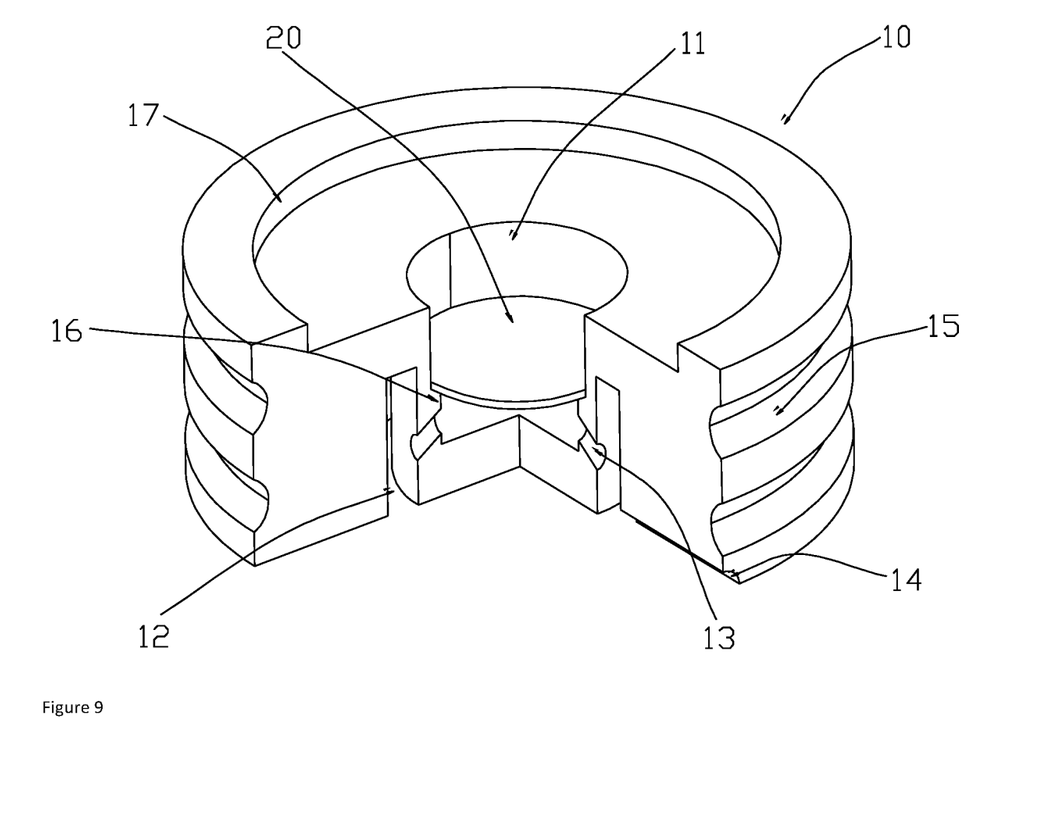
FIG. 9 is a partially cross-sectional diagram of an angle according to a second embodiment of the present disclosure.
Figure 10:
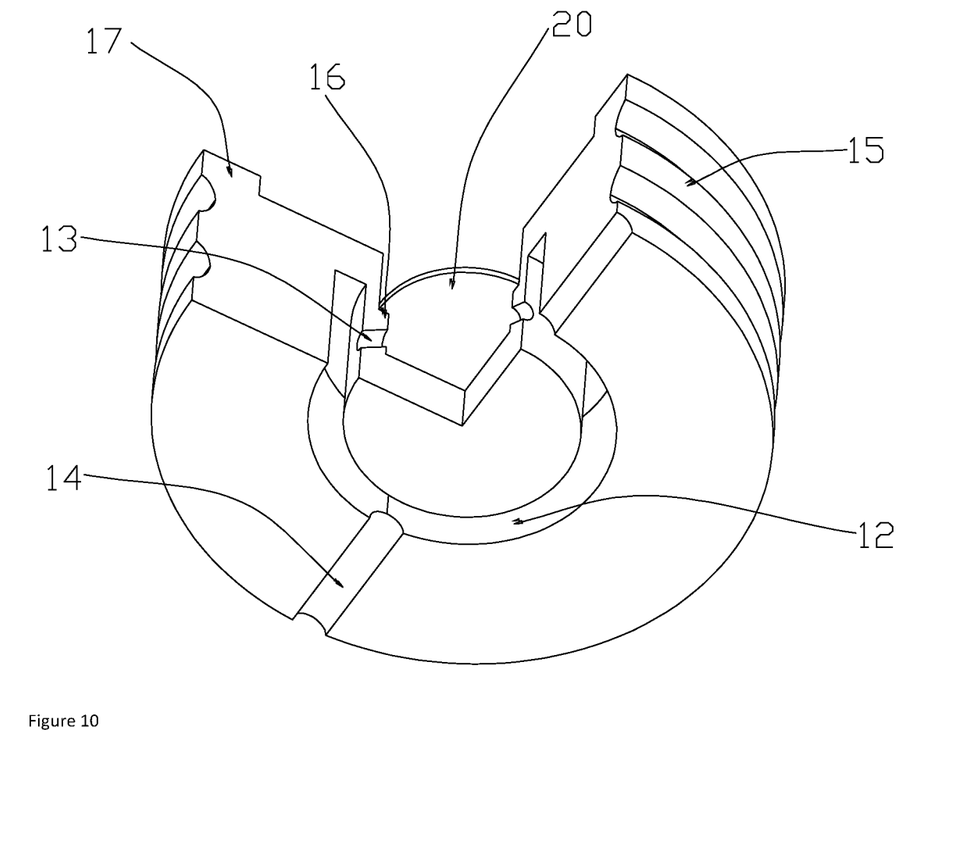
FIG. 10 is a partially cross-sectional diagram of another angle according to a second embodiment of the present disclosure.

By the arrangement of the above structure, during use, the base is arranged on a drink or food container 40. The lower surface of the base 11 is abutted with an edge of an opening of the drink or food container 40 to cover an opening of the drink or food container 40. The lower surface of the base 11 and an inner wall of the drink or food container 40 form a smoking space. The lower surface of the base 11 is flat and can adapt to various containers 40. The fuel is placed in the combustion groove 11 and is ignited. The fuel is combusted to produce smoke. The smoke passes through the side wall of the combustion groove 11 and flows into the drink or food container 40 along the smoke passage 12 to smoke the drink or food. Furthermore, the supporting net 20 can support the fuel, prevent the fuel and ash after fuel combustion from entering the drink or food container 40 along the smoke passage 12, and ensure the cleanliness of the drink or food.

In this embodiment, the base 10 is provided with a through hole 13 which penetrates through the combustion groove 11; the through hole 13 is arranged below the supporting net 20; and the smoke passage 12 is communicated to the combustion groove 11 through the through hole 13. By the arrangement of the above structure, the through hole 13 is arranged below the supporting net 20, which can separate the fuel above the supporting net and the ash after fuel combustion from the through hole 13. This can effectively prevent the fuel and the ash after fuel combustion from entering the drink or food container 40 along the through hole 13, so as to ensure the cleanliness of the drink or food and improve the user experience.

In this embodiment, the through hole 13 slantways extends downwards from the combustion groove 11 to the smoke passage 12, and a gap exists between an upper end of the through hole 13 and a bottom wall of the combustion groove 11. By the arrangement of the above structure, the through hole 13 is slantways arranged and is communicated to the combustion groove 11 and the smoke passage 12, so that the smoke can flow smoothly into the smoke passage 12 along the through hole 13 and then into the drink or food container 40, thereby improving the smoke circulation speed. The gap between the upper end of the through hole 13 and the bottom wall of the combustion groove 11 can accommodate small ash that falls from meshes of the supporting net to prevent the ash from flowing directly into the drink or food container 40 along the through hole 13—the smoke passage 12, which further ensures the cleanliness of the drink or food and improves the user experience. Moreover, in a production process, a drill bit can be slantways plugged from the combustion groove 11 into the side wall of the combustion groove 11 to form the inclined through hole 13, which facilitates production and processing and improves the production efficiency of the product.

In this embodiment, the smoke passage 12 is arranged in an annular shape around the combustion groove 11; the base is provided with a plurality of through holes 13; and the various through holes 13 are arranged on the side wall of the combustion groove 11 at intervals. By the arrangement of the above structure, the various through holes 13 are spaced part from each other, so that the smoke can flow uniformly into the smoke passage 12. The annular smoke passage 12 can allow the smoke flowing out of the various through holes to be converged and flow into the container 40, so as to avoid turbulence and enable the smoke to flow smoothly into the container 40. The smoke can suffuse more quickly into the smoking space to enhance the smoking effect of the product.

In this embodiment, a lower end of the through hole 13 is communicated to a middle part of the smoke passage 12, so that the smoke passage 12 is divided into an upper part and a lower part. During use, the smoke flows into the smoking space along the through hole 13 and the lower part of the smoke passage 12 to effectively smoke the drink and/or food. When the smoke rises, the smoke can be effectively accommodated in the upper part of the smoke passage 12 and is intercepted into the smoking space, which improves the smoking effect of the product.

In this embodiment, the lower surface of the base 10 is further provided with an air exchange slot 14; and the air exchange slot 14 extends from the smoke passage 12 towards an edge of the base 10. During use, the smoke flows into the smoking space along the through hole 13 and the smoke passage 12. Meanwhile, air in the smoking space flows out through the air exchange slot 14 to achieve air exchange and ensure an air pressure in the smoking space, making it easier for the smoke to enter the smoking space. Moreover, a density of the smoke is greater than that of the air, so that the smoke is converged at the bottom of the smoking space, to effectively smoke products.

In this embodiment, a side surface of the base 10 is provided with a friction surface 15, and the friction surface 15 is configured to be gripped by a user. During use, the user can grip the friction surface 15. Due to a high friction coefficient of the friction surface 15, the user can grip the product more stably, thereby achieving a better user experience. An open slot can be arranged on the friction surface 15 to increase the friction coefficient of the friction surface 15, making it convenient for the user to grip the product.

In this embodiment, a middle part of the supporting net 20 is sunken downwards to form an accommodating part 21; a lower surface of an edge of the supporting net 20 is abutted with the upper surface of the base 10; and the accommodating part 21 is inserted along the combustion groove 11. By the arrangement of the above structure, the accommodating part 21 is inserted into the combustion groove 11, which can effectively isolate the fuel from the combustion groove 11 and protect the combustion groove 11 and can also effectively prevent the fuel and the ash after fuel combustion from falling into the combustion groove 11, thereby ensuring the cleanliness in the drink or food container 40 and improving the user experience.

In this embodiment, an abutting platform 16 is arranged on the side wall of the combustion chamber 11 in a protruding manner; the supporting net 20 is inserted into the combustion groove 11; and an edge of the supporting net 20 is abutted with the abutting platform 16. By the arrangement of the above structure, the supporting net 20 is inserted into the combustion groove 11 and is abutted with the abutting platform 16, which can effectively fix the supporting net 20 in the combustion groove 11. Moreover, the supporting net 20 can effectively support the fuel to improve the stability and service life of the product. The shape of the supporting net 20 matches the shape of the combustion groove.

In this embodiment, the smoking device for drink and food further includes a cover body 30; a mounting block 17 is arranged around an edge of the upper surface of the base 10 in a protruding manner; and the cover body 30 is abutted with the mounting block 17 and is covered at the upper surface of the base 10. By the arrangement of the above structure, during use, the cover body 30 is abutted with the mounting block 17 and is covered at the upper surface of the base 10, which can isolate the combustion groove 11 from the outside, so that the amount of the air inside the combustion groove 11 is reduced, causing insufficient fuel combustion and producing smoke more easily, which improves the efficiency of smoking drink and/or food by using the product. A positioning block 31 is arranged at a bottom of the cover body 30 in a protruding manner. The positioning block 31 is inserted into a space formed between the mounting block 17 and the upper surface of the base 10, making it convenient for the user to position and connect the cover body 30 with the base 10.

Referring to FIG. 1 to FIG. 10, a smoking method for drink and food includes: providing a smoking device, wherein the smoking device includes:

a base 10, wherein an upper surface of the base 10 is sunken downwards to form a combustion groove 11; the combustion groove 11 is configured to accommodate fuel; a lower surface of the base 10 is sunken upwards to form a smoke passage 12; the smoke passage 12 extends upwards through a side wall of the combustion groove 11 and is communicated to the combustion groove 11; and a supporting net 20, wherein at least a portion of the supporting net 20 is inserted to a bottom of the combustion groove 11 and is configured to support the fuel; and when the fuel in the combustion groove 11 is ignited, the smoke passage 12 allows smoke produced by fuel combustion in the combustion groove 11 to pass through.

By the arrangement of the above structure, during use, the base is arranged on a drink or food container 40. The lower surface of the base 11 is abutted with an edge of an opening of the drink or food container 40 to cover an opening of the drink or food container 40. The lower surface of the base 11 and an inner wall of the drink or food container 40 form a smoking space. The lower surface of the base 11 is flat and can adapt to various containers 40. The fuel is placed in the combustion groove 11 and is ignited. The fuel is combusted to produce smoke. The smoke passes through the side wall of the combustion groove 11 and flows into the drink or food container 40 along the smoke passage 12 to smoke the drink or food. Furthermore, the supporting net 20 can support the fuel, prevent the fuel and ash after fuel combustion from entering the drink or food container 40 along the smoke passage 12, and ensure the cleanliness of the drink or food.

In this embodiment, the base 10 is provided with a through hole 13 which penetrates through the combustion groove 11; the through hole 13 is arranged below the supporting net 20; and the smoke passage 12 is communicated to the combustion groove 11 through the through hole 13. By the arrangement of the above structure, the through hole 13 is arranged below the supporting net 20, which can separate the fuel above the supporting net and the ash after fuel combustion from the through hole 13. This can effectively prevent the fuel and the ash after fuel combustion from entering the drink or food container 40 along the through hole 13, so as to ensure the cleanliness of the drink or food and improve the user experience.

In this embodiment, the through hole 13 slantways extends downwards from the combustion groove 11 to the smoke passage 12, and a gap exists between an upper end of the through hole 13 and a bottom wall of the combustion groove 11. By the arrangement of the above structure, the through hole 13 is slantways arranged and is communicated to the combustion groove 11 and the smoke passage 12, so that the smoke can flow smoothly into the smoke passage 12 along the through hole 13 and then into the drink or food container 40, thereby improving the smoke circulation speed. The gap between the upper end of the through hole 13 and the bottom wall of the combustion groove 11 can accommodate small ash that falls from meshes of the supporting net to prevent the ash from flowing directly into the drink or food container 40 along the through hole 13—the smoke passage 12, which further ensures the cleanliness of the drink or food and improves the user experience. Moreover, in a production process, a drill bit can be slantways plugged from the combustion groove 11 into the side wall of the combustion groove 11 to form the inclined through hole 13, which facilitates production and processing and improves the production efficiency of the product.

In this embodiment, the smoke passage 12 is arranged in an annular shape around the combustion groove 11; the base is provided with a plurality of through holes 13; and the various through holes 13 are arranged on the side wall of the combustion groove 11 at intervals. By the arrangement of the above structure, the various through holes 13 are spaced part from each other, so that the smoke can flow uniformly into the smoke passage 12. The annular smoke passage 12 can allow the smoke flowing out of the various through holes to be converged and flow into the container 40, so as to avoid turbulence and enable the smoke to flow smoothly into the container 40. The smoke can suffuse more quickly into the smoking space to enhance the smoking effect of the product.

In this embodiment, a lower end of the through hole 13 is communicated to a middle part of the smoke passage 12, so that the smoke passage 12 is divided into an upper part and a lower part. During use, the smoke flows into the smoking space along the through hole 13 and the lower part of the smoke passage 12 to effectively smoke the drink and/or food. When the smoke rises, the smoke can be effectively accommodated in the upper part of the smoke passage 12 and is intercepted into the smoking space, which improves the smoking effect of the product.

In this embodiment, the lower surface of the base 10 is provided with an air exchange slot 14; and the air exchange slot 14 extends from the smoke passage 12 towards an edge of the base 10. During use, the smoke flows into the smoking space along the through hole 13 and the smoke passage 12. Meanwhile, air in the smoking space flows out through the air exchange slot 14 to achieve air exchange and ensure an air pressure in the smoking space, making it easier for the smoke to enter the smoking space. Moreover, a density of the smoke is greater than that of the air, so that the smoke is converged at the bottom of the smoking space, to effectively smoke products.

In this embodiment, a side surface of the base 10 is provided with a friction surface 15, and the friction surface 15 is configured to be gripped by a user. During use, the user can grip the friction surface 15. Due to a high friction coefficient of the friction surface 15, the user can grip the product more stably, thereby achieving a better user experience. An open slot can be arranged on the friction surface 15 to increase the friction coefficient of the friction surface 15, making it convenient for the user to grip the product.

In this embodiment, a middle part of the supporting net 20 is provided with an accommodating part 21 that is sunken downwards; a lower surface of an edge of the supporting net 20 is abutted with the upper surface of the base 10; and the accommodating part 21 is inserted along the combustion groove 11. By the arrangement of the above structure, the accommodating part 21 is inserted into the combustion groove 11, which can effectively isolate the fuel from the combustion groove 11 and protect the combustion groove 11 and can also effectively prevent the fuel and the ash after fuel combustion from falling into the combustion groove 11, thereby ensuring the cleanliness in the drink or food container 40 and improving the user experience.

In this embodiment, an abutting platform 16 is arranged on the side wall of the combustion chamber 11 in a protruding manner; the supporting net 20 is inserted into the combustion groove 11; and an edge of the supporting net 20 is abutted with the abutting platform 16. By the arrangement of the above structure, the supporting net 20 is inserted into the combustion groove 11 and is abutted with the abutting platform 16, which can effectively fix the supporting net 20 in the combustion groove 11. Moreover, the supporting net 20 can effectively support the fuel to improve the stability and service life of the product. The shape of the supporting net 20 matches the shape of the combustion groove.

In this embodiment, the smoking method for drink and food further includes: providing a cover body 30, wherein a protruding mounting block 17 is arranged around an edge of the upper surface of the base 10; and the cover body 30 is abutted with the mounting block 17 and is covered at the upper surface of the base 10. By the arrangement of the above structure, during use, the cover body 30 is abutted with the mounting block 17 and is covered at the upper surface of the base 10, which can isolate the combustion groove 11 from the outside, so that the amount of the air inside the combustion groove 11 is reduced, causing insufficient fuel combustion and producing smoke more easily, which improves the efficiency of smoking drink and/or food by using the product. A positioning block 31 is arranged at a bottom of the cover body 30 in a protruding manner. The positioning block 31 is inserted into a space formed between the mounting block 17 and the upper surface of the base 10, making it convenient for the user to position and connect the cover body 30 with the base 10.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A smoking device for drink and food, comprising:
   a base, wherein an upper surface of the base is sunken downwards to form a combustion groove; the combustion groove is configured to accommodate fuel; a lower surface of the base is sunken upwards to form a smoke passage; the smoke passage extends upwards through a side wall of the combustion groove and is communicated to the combustion groove; and
   a supporting net, wherein at least a portion of the supporting net is inserted to a bottom of the combustion groove and is configured to support the fuel; and when the fuel in the combustion groove is ignited, the smoke passage allows smoke produced by fuel combustion in the combustion groove to pass through, and wherein the base is provided with a through hole which penetrates through the combustion groove; the through hole is arranged below the supporting net; and the smoke passage is communicated to the combustion groove through the through hole.

2. The smoking device for drink and food according to claim 1, wherein the through hole slantways extends downwards from the combustion groove to the smoke passage, and a gap exists between an upper end of the through hole and a bottom wall of the combustion groove.

3. The smoking device for drink and food according to claim 2, wherein the smoke passage is arranged in an annular shape around the combustion groove; the base is provided with a plurality of through holes; and the various through holes are arranged on the side wall of the combustion groove at intervals.

4. The smoking device for drink and food according to claim 2, wherein a lower end of the through hole is communicated to a middle part of the smoke passage, so that the smoke passage is divided into an upper part and a lower part.

5. The smoking device for drink and food according to claim 1, wherein the lower surface of the base is further provided with an air exchange slot; and the air exchange slot extends from the smoke passage towards an edge of the base.

6. The smoking device for drink and food according to claim 1, wherein a side surface of the base is provided with a friction surface, and the friction surface is configured to be gripped by a user.

7. The smoking device for drink and food according to claim 1, wherein a middle part of the supporting net is sunken downwards to form an accommodating part; a lower surface of an edge of the supporting net is abutted with the upper surface of the base; and the accommodating part is inserted along the combustion groove.

8. The smoking device for drink and food according to claim 1, wherein an abutting platform is arranged on the side wall of the combustion chamber in a protruding manner; the supporting net is inserted into the combustion groove; and an edge of the supporting net is abutted with the abutting platform.

9. The smoking device for drink and food according to claim 1, further comprising a cover body, wherein a mounting block is arranged around an edge of the upper surface of the base in a protruding manner; and the cover body is abutted with the mounting block and is covered at the upper surface of the base.

10. A smoking method for drink and food, comprising: providing a smoking device, wherein the smoking device comprises:
    a base, wherein an upper surface of the base is sunken downwards to form a combustion groove; the combustion groove is configured to accommodate fuel; a lower surface of the base is sunken upwards to form a smoke passage; the smoke passage extends upwards through a side wall of the combustion groove and is communicated to the combustion groove; and
    a supporting net, wherein at least a portion of the supporting net is inserted to a bottom of the combustion groove and is configured to support the fuel; and when the fuel in the combustion groove is ignited, the smoke passage allows smoke produced by fuel combustion in the combustion groove to pass through, and wherein the base is provided with a through hole which penetrates through the combustion groove; the through hole is arranged below the supporting net; and the smoke passage is communicated to the combustion groove through the through hole.

11. The smoking method for drink and food according to claim 10, wherein the through hole slantways extends downwards from the combustion groove to the smoke passage, and a gap exists between an upper end of the through hole and a bottom wall of the combustion groove.

12. The smoking method for drink and food according to claim 11, wherein the smoke passage is arranged in an annular shape around the combustion groove; the base is provided with a plurality of through holes; and the various through holes are arranged on the side wall of the combustion groove at intervals.

13. The smoking method for drink and food according to claim 11, wherein a lower end of the through hole is communicated to a middle part of the smoke passage, so that the smoke passage is divided into an upper part and a lower part.

14. The smoking method for drink and food according to claim 10, wherein the lower surface of the base is provided with an air exchange slot; and the air exchange slot extends from the smoke passage towards an edge of the base.

15. The smoking method for drink and food according to claim 10, wherein a side surface of the base is provided with a friction surface, and the friction surface is configured to be gripped by a user.

16. The smoking method for drink and food according to claim 10, wherein a middle part of the supporting net is provided with an accommodating part that is sunken downwards; a lower surface of an edge of the supporting net is abutted with the upper surface of the base; and the accommodating part is inserted along the combustion groove.

17. The smoking method for drink and food according to claim 10, wherein an abutting platform is arranged on the side wall of the combustion chamber in a protruding manner; the supporting net is inserted into the combustion groove; and an edge of the supporting net is abutted with the abutting platform.

18. The smoking method for drink and food according to claim 10, further comprising: providing a cover body, wherein a protruding mounting block is arranged around an edge of the upper surface of the base; and the cover body is abutted with the mounting block and is covered at the upper surface of the base.

* * * * *